US011231092B2

(12) United States Patent
Iwasaki et al.

(10) Patent No.: US 11,231,092 B2
(45) Date of Patent: Jan. 25, 2022

(54) CHAIN GUIDE

(71) Applicant: TSUBAKIMOTO CHAIN CO., Osaka (JP)

(72) Inventors: Yoshitaka Iwasaki, Osaka (JP); Kaori Mori, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 231 days.

(21) Appl. No.: 16/597,089

(22) Filed: Oct. 9, 2019

(65) Prior Publication Data

US 2020/0116240 A1    Apr. 16, 2020

(30) Foreign Application Priority Data

Oct. 16, 2018 (JP) .................................. 2018-195250

(51) Int. Cl.
*F16H 7/18* (2006.01)

(52) U.S. Cl.
CPC ......... *F16H 7/18* (2013.01); *F16H 2007/185* (2013.01)

(58) Field of Classification Search
CPC .............. F16H 2007/0872; F16H 7/18; F16H 2007/185; F16H 7/08
USPC .......................................................... 474/111
See application file for complete search history.

(56) References Cited

U.S. PATENT DOCUMENTS

| 5,222,917 | A | * | 6/1993 | Shimaya | ................... | F16H 7/08 474/101 |
| 5,813,935 | A | * | 9/1998 | Dembosky | ............... | F16H 7/18 474/111 |
| 5,820,502 | A | * | 10/1998 | Schulze | ................... | F16H 7/08 474/140 |
| 6,086,498 | A | * | 7/2000 | Hashimoto | ............... | F16H 7/08 474/111 |
| 6,302,816 | B1 | * | 10/2001 | Wigsten | ................... | F16H 7/18 474/111 |
| 7,476,169 | B2 | * | 1/2009 | Konno | ..................... | F16H 7/18 474/111 |

(Continued)

FOREIGN PATENT DOCUMENTS

| JP | 2013-32815 | A | 2/2013 |
| JP | 2013-50181 | A | 3/2013 |

(Continued)

*Primary Examiner* — Henry Y Liu
(74) *Attorney, Agent, or Firm* — Westerman, Hattori, Daniels & Adrian, LLP

(57) ABSTRACT

An object of the present invention is to provide a chain guide that eliminates the burden of assembling a guide shoe and a base member together, and prevents the guide shoe from being limited in its movement in the longitudinal guiding direction relative to the base member to improve durability. The guide shoe and the base member of the chain guide according to the invention are united by being integrally molded. The chain guide includes a fixed engaging part where the guide shoe engages with the base member such that the guide shoe is restricted from moving in the longitudinal guiding direction relative to the base member, and a movable engaging part where the guide shoe engages with the base member such that the guide shoe is slidable relative to the base member. A molding gate mark is positioned at or near the fixed engaging part.

5 Claims, 19 Drawing Sheets

(56) References Cited

U.S. PATENT DOCUMENTS

| | | | | |
|---|---|---|---|---|
| 8,430,774 B2* | 4/2013 | Konno | ............ | F16H 7/18 474/140 |
| 8,740,737 B2* | 6/2014 | Konno | ............ | F16H 7/18 474/140 |
| 8,747,263 B2* | 6/2014 | Konno | ............ | F16H 7/18 474/111 |
| 8,900,079 B2* | 12/2014 | Mori | ............ | F16H 7/18 474/140 |
| 10,570,996 B2* | 2/2020 | Fukuyama | ............ | F16H 7/08 |
| 2002/0004433 A1* | 1/2002 | Fujiwara | ............ | F16H 7/18 474/111 |
| 2003/0040385 A1* | 2/2003 | Konno | ............ | F16H 7/18 474/111 |
| 2003/0134704 A1* | 7/2003 | Konno | ............ | F01L 1/024 474/111 |
| 2003/0139236 A1* | 7/2003 | Konno | ............ | F16H 7/18 474/111 |
| 2003/0144100 A1* | 7/2003 | Konno | ............ | F16H 7/18 474/111 |
| 2004/0214672 A1* | 10/2004 | Thomas | ............ | F16H 7/18 474/111 |
| 2005/0026730 A1* | 2/2005 | Hashimoto | ............ | F16H 7/18 474/111 |
| 2005/0096167 A1* | 5/2005 | Konno | ............ | F16H 7/18 474/111 |
| 2005/0107196 A1* | 5/2005 | Konno | ............ | F16H 7/18 474/111 |
| 2005/0266946 A1* | 12/2005 | Thomas | ............ | B29C 45/1635 474/111 |
| 2006/0172835 A1* | 8/2006 | Konno | ............ | F16H 7/18 474/111 |
| 2007/0155555 A1* | 7/2007 | Fukata | ............ | F16H 7/18 474/111 |
| 2009/0105023 A1* | 4/2009 | Oota | ............ | F16H 7/18 474/111 |
| 2013/0035184 A1* | 2/2013 | Konno | ............ | F16H 7/18 474/111 |
| 2013/0053197 A1* | 2/2013 | Konno | ............ | F16H 7/18 474/140 |
| 2013/0059688 A1* | 3/2013 | Konno | ............ | F16H 7/18 474/140 |
| 2013/0090201 A1* | 4/2013 | Mori | ............ | F16H 7/18 474/140 |
| 2013/0210566 A1* | 8/2013 | Konno | ............ | F16H 7/18 474/111 |
| 2014/0057749 A1* | 2/2014 | Konno | ............ | F16H 7/08 474/111 |
| 2015/0204218 A1* | 7/2015 | Utaki | ............ | F01L 1/46 474/140 |
| 2015/0204437 A1* | 7/2015 | Utaki | ............ | F16H 7/18 474/91 |
| 2015/0219190 A1* | 8/2015 | Geibel | ............ | F16H 7/18 474/111 |
| 2018/0038476 A1* | 2/2018 | Konno | ............ | F16H 7/18 |
| 2018/0245673 A1* | 8/2018 | Nakata | ............ | F16H 7/18 |

FOREIGN PATENT DOCUMENTS

| | | |
|---|---|---|
| JP | 2013-83292 A | 5/2013 |
| JP | 2013-108612 A | 6/2013 |
| JP | 2013-164134 A | 8/2013 |
| JP | 2014-40877 A | 3/2014 |
| JP | 5611145 B2 | 10/2014 |
| JP | 5634356 B2 | 12/2014 |
| JP | 5808299 B2 | 11/2015 |

* cited by examiner

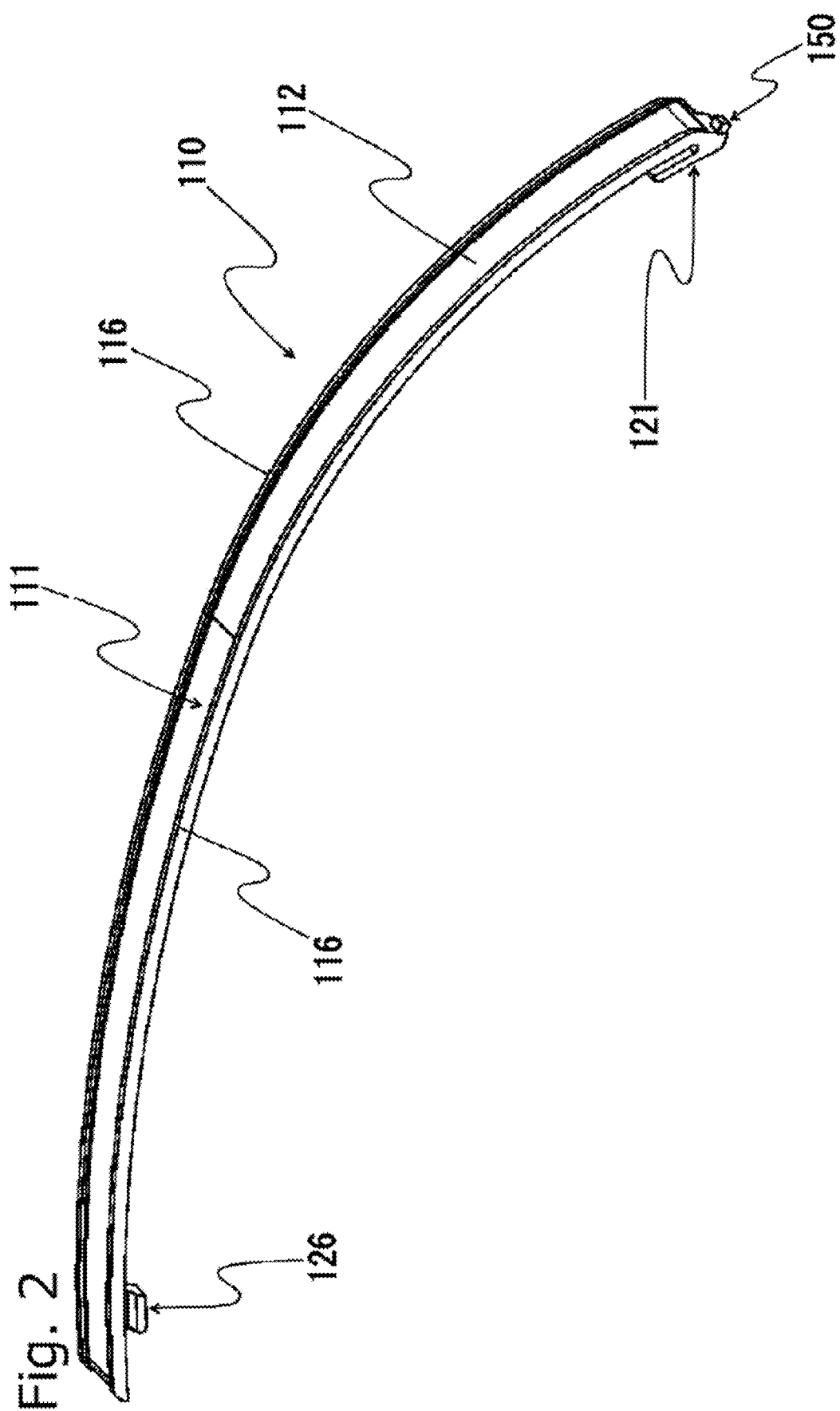

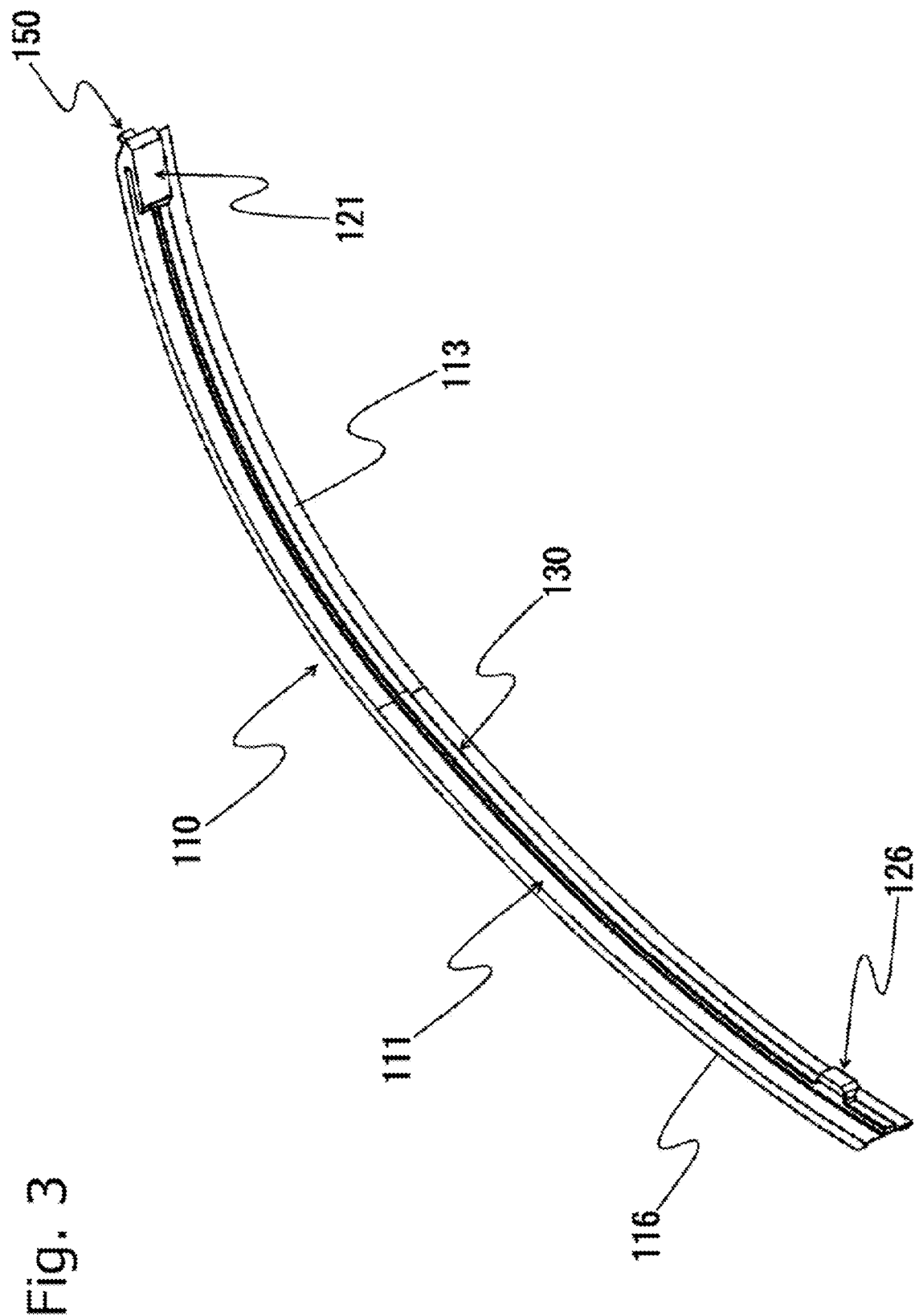

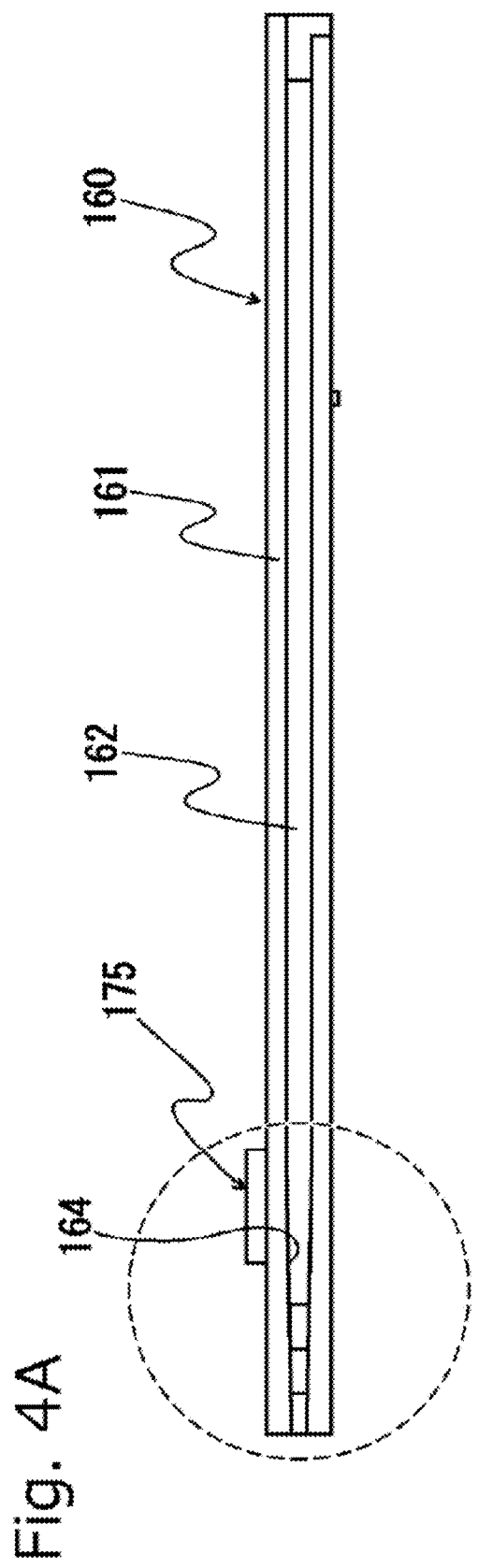

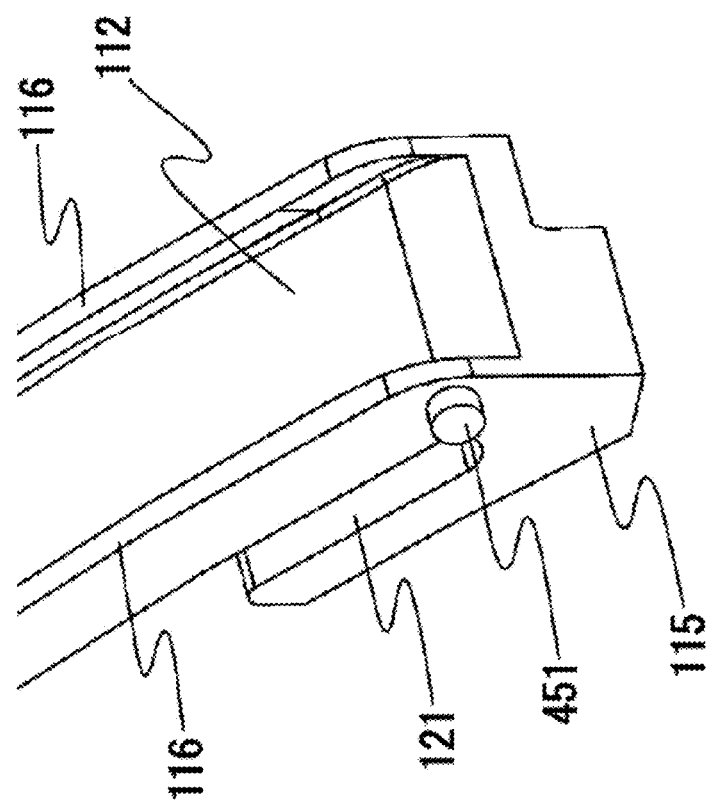

CHAIN GUIDE

BACKGROUND OF THE INVENTION

1. Field of the Invention

The present invention relates to a chain guide made up of a guide shoe having a slidingly-contacting surface on a front side for a running chain to be in sliding contact thereon, and a base member having a shoe support surface that supports the backside of the guide shoe along the longitudinal guiding direction, these being integrally formed and united by two-material molding.

2. Description of the Related Art

Some known chain guides conventionally used for transmissions of automobile engines and the like have a guide shoe with a sliding surface for a chain to slide on, and a base member for retaining the shape of the guide shoe, separately molded and assembled together.

Chain guides having the guide shoe and base member integrally formed and united by two-material molding have also been known (see, for example, Japanese Patent Nos. 5808299, 5634356, and 5611145, and Japanese Patent Application Laid-open Nos. 2013-164134, 2013-108612, and 2013-083292). For such a chain guide, the base member is formed (from a primary material) by injection molding in a first molding step, which is followed by a second molding step wherein the guide shoe is formed by injection molding, so that the guide shoe is integrated to the base member.

For the chain guide integrally formed by two-material molding, it is well known to form a base groove in the shoe support surface of the base member along the longitudinal guiding direction, and to form a shoe rib in the backside of the guide shoe to be engaged with the base groove such as to be movable in the longitudinal guiding direction in order to enhance the rigidity along the longitudinal guiding direction.

SUMMARY OF THE INVENTION

Generally, in a chain guide having a base member and a guide shoe united by being integrally formed, the guide shoe expands and contracts in a longitudinal guiding direction relative to the base member due to a difference in thermal expansion and contraction in the longitudinal guiding direction between the base member and the guide shoe, which depends on the temperature of the environment in which the chain guide is used.

Since the base member and the guide shoe are integrally molded from two materials, sometimes, the primary material that is to become the base member may melt due to the heat during the molding of the guide shoe from the secondary material, and the guide shoe and the base member may be welded to each other. When this happens, the guide shoe is limited in its movement in the longitudinal guiding direction relative to the base member, and when its movement is restricted in the longitudinal guiding direction relative to the base member, the guide shoe may break.

Such a problem is more likely to occur particularly in a large chain guide that has an overall length of more than 300 mm, for example, when it is used in a harsh environment of use where temperature changes are large, because the stress generated by a difference in thermal expansion and contraction between both materials of the guide shoe and the base member is large.

In a chain guide having a guide shoe and a base member united by being integrally formed by two-material molding, deformation can easily occur during molding particularly in places where there is a hole or a pivot, i.e., where the cross section changes largely. When deformation occurs during molding, generally, it causes the base groove to be reduced in width. When such a deformation occurs and the width of the base groove is reduced, the guide shoe may be limited in its movement in the longitudinal guiding direction relative to the base member because of the increased resistance produced when the guide shoe moves on the base member. There is the risk of guide shoe breakage in this respect, too.

The present invention solves the problems encountered by the prior art described above, an object of the invention being to provide a chain guide that eliminates the burden of assembling a guide shoe and a base member together, and prevents the guide shoe from being limited in its movement in the longitudinal guiding direction relative to the base member to improve durability.

The present invention solves the problems described above by providing a chain guide including a guide shoe having a slidingly-contacting surface on a front side for a running chain to be in sliding contact thereon, and a base member having a shoe support surface for supporting a backside of the guide shoe along a longitudinal guiding direction, the guide shoe and the base member being united by being integrally formed. The guide shoe has a shoe rib formed on the backside to extend in the longitudinal guiding direction, and the base member has a base groove formed in the shoe support surface to extend in the longitudinal guiding direction. The base groove is configured to engage with the shoe rib such that the shoe rib is movable relative to the base member in the longitudinal guiding direction and restricted from moving in a width direction. The chain guide includes a fixed engaging part where the guide shoe engages with the base member such that the guide shoe is restricted from moving in the longitudinal guiding direction relative to the base member, and a movable engaging part where the guide shoe engages with the base member such that the guide shoe is movable in the longitudinal guiding direction relative to the base member. The chain guide includes a molding gate mark positioned at or near the fixed engaging part.

According to the chain guide of the invention set forth in claim 1, the guide shoe and the base member are united by being integrally formed, so that no assembling work is necessary for integrating the guide shoe and the base member. The molding gate mark is positioned at or near the fixed engaging part, i.e., the gate that tends to be heated to a high temperature during the molding is located at or near the point where there will be the fixed engaging part, so that welding is less likely to occur on the side where there will be the movable engaging part. The guide shoe is therefore prevented from being limited in its movement along the longitudinal guiding direction, whereby the intended performance of the guide shoe is ensured. Thus possible breakage of the guide shoe is reliably prevented, which may be caused by a thermal stress resulting from a difference in thermal expansion and contraction between the guide shoe and the base member under varying temperatures of the environment of use, and the durability can be improved.

According to the configuration set forth in claim 2, a guide shoe forming material and a base member forming material can be injected into the mold uniformly during the molding, and welding on the side where there will be the movable engaging part can be prevented even more reliably.

According to the configuration set forth in claims 3 and 4, the base groove has an E-chamfered cross-sectional shape at an open edge, with a radius of curvature of the R-chamfered cross-sectional shape being 1 mm or more, or has a C-chamfered cross-sectional shape at an open edge, and since such a cross-sectional shape can dissipate the heat during the molding of the secondary material that is to become the guide shoe, melting of the base member is less likely to occur, which may result from concentration of the heat during the molding of the guide shoe at the open edge of the base groove of the base member formed from the primary material. Deterioration of performance of the guide shoe caused by welding of the guide shoe and the base member can be avoided. Thus possible breakage of the guide shoe is reliably prevented, which may be caused by a thermal stress resulting from a difference in thermal expansion and contraction between the guide shoe and the base member under varying temperatures of the environment of use, and the durability can be improved even more.

According to the configuration set forth in claim 5, the base groove increases in width gradually toward the fixed engaging part along the longitudinal guiding direction in a region including a position where the movable engaging part is formed. The base groove opens up as a whole, so that performance deterioration of the guide shoe can be prevented even when the groove has been deformed during the molding. Thus possible breakage of the guide shoe is reliably prevented, which may be caused by a thermal stress resulting from a difference in thermal expansion and contraction between the guide shoe and the base member under varying temperatures of the environment of use, and the durability can be improved even more.

BRIEF DESCRIPTION OF THE DRAWINGS

FIG. 2 is a perspective view of the structure of a guide shoe in the chain guide shown in FIG. 1 viewed from the front side;

FIG. 3 is a perspective view of the structure of the guide shoe in the chain guide shown in FIG. 1 viewed from the backside;

FIG. 4A is a plan view illustrating the structure of a base member in the chain guide shown in FIG. 1;

FIG. 10B is an enlarged perspective view of one end of the fixed engaging part side in the longitudinal guiding direction of the guide shoe, in another configuration example, of the chain guide according to the present invention;

DESCRIPTION OF THE PREFERRED EMBODIMENTS

The chain guide of the present invention includes a guide shoe having a slidingly-contacting surface on a front side for a running chain to be in sliding contact thereon, and a base member having a shoe support surface for supporting a backside of the guide shoe along a longitudinal guiding direction, the guide shoe and the base member being united by being integrally formed by two-material molding, and may have any specific form as long as the chain guide has a fixed engaging part where the guide shoe engages with the base member such that the guide shoe is restricted from moving in the longitudinal guiding direction relative to the base member, and a movable engaging part where the guide shoe engages with the base member such that the guide shoe is movable in the longitudinal guiding direction relative to the base member, and the chain guide has a molding gate mark positioned at or near the fixed engaging part.

The chain guided by the chain guide of the present invention is a roller chain or a silent chain, for example.

The chain guide of the present invention is either a movable chain guide or a fixed chain guide.

The chain guide of the present invention may be installed not only in automobile motors (including engines) but also in motors (including engines) for applications other than automobiles, industrial machines, or transfer devices.

A chain guide according to one embodiment of the present invention will be hereinafter described with reference to the drawings.

EXAMPLES

Figure 1:
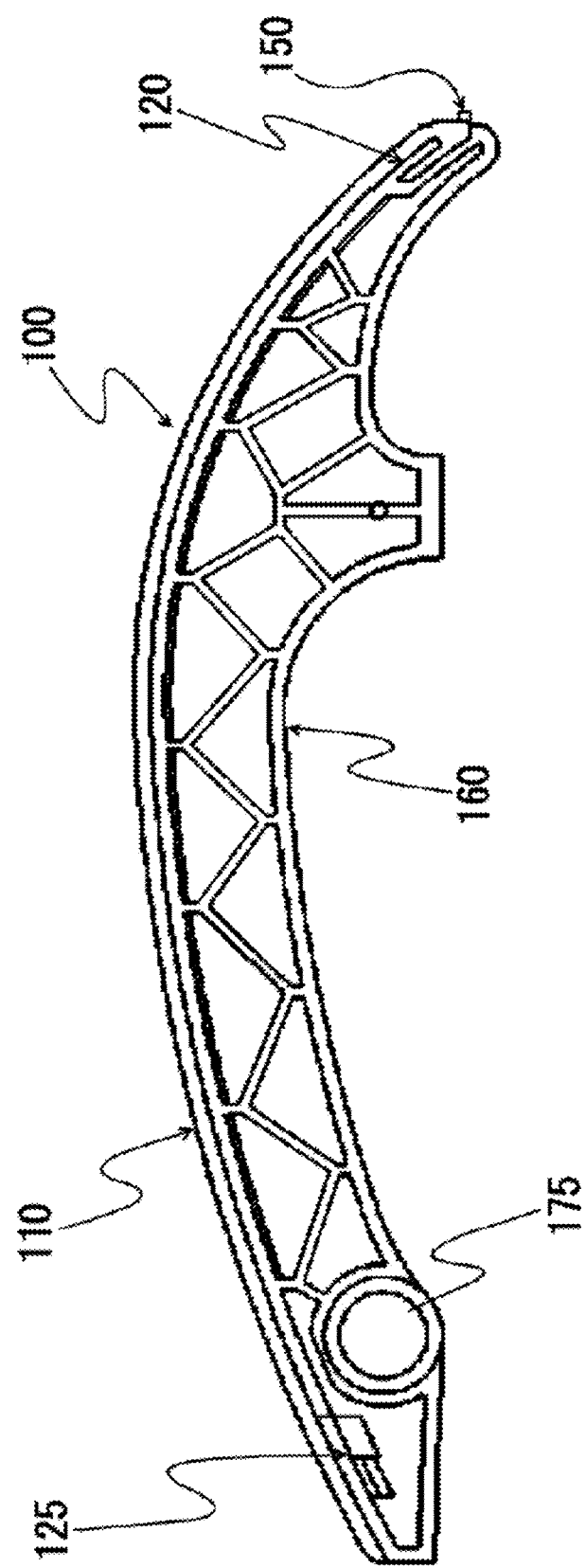
FIG. 1 is a side view illustrating the structure of a chain guide according to one embodiment of the present invention.

FIG. 1 is a side view illustrating one example of the structure of a chain guide according to the present invention.

The chain guide 100 includes a guide shoe 110 for slidably guiding a running chain along a longitudinal guiding direction, and a base member 160 that supports the guide shoe 110.

The guide shoe 110 includes, as shown in FIG. 2 and FIG. 3, a sliding surface forming part 111 having the sliding surface (shoe surface) 112 extending along the longitudinal guiding direction for guiding the chain, lips 116 that guide the running chain, a fixed hook 121 engaged with the base member 160 to form a fixed engaging part 120, a movable hook 126 engaged with the base member 160 to form a movable engaging part 125, and a shoe rib 130 slidably engaged with a base groove provided in a shoe support surface of the base member 160.

The lips 116 are plate-like portions standing upright perpendicularly to the sliding surface 112 and formed to extend over the entire length in the longitudinal guiding direction at both edges in the width direction of the guide of the sliding surface 112 of the sliding surface forming part 111.

The fixed hook 121 is configured to restrict the movement of the guide shoe 110 in the height direction and in the longitudinal guiding direction, and to fix the guide shoe 110 in the longitudinal guiding direction, by the engagement with the base member 160, at one end in the longitudinal guiding direction. In this embodiment, the fixed hook 121 is provided on one side in the width direction of the guide.

The movable hook 126 is configured to restrict the movement of the guide shoe 110 in the height direction, by the engagement with the base member 160, at the other end in the longitudinal guiding direction, while allowing the guide shoe to move in the longitudinal guiding direction relative to the base member 160 when the guide shoe 110 undergoes expansion or contraction in the longitudinal guiding direction due to thermal deformation.

The shoe rib 130 has a quadrilateral cross section, for example, and extends along the longitudinal guiding direction on the backside 113 of the sliding surface forming part 111. The pair of side faces and the top face of this shoe rib 130 are in surface contact respectively with the pair of side faces and the bottom face of the base groove, which has a quadrilateral cross section, of the base member 160 to be described later such as to be slidable in the longitudinal guiding direction.

While one shoe rib 130 is formed in the width direction of the guide in this embodiment, two or more rows of shoe ribs may be provided.

Figure 4B:
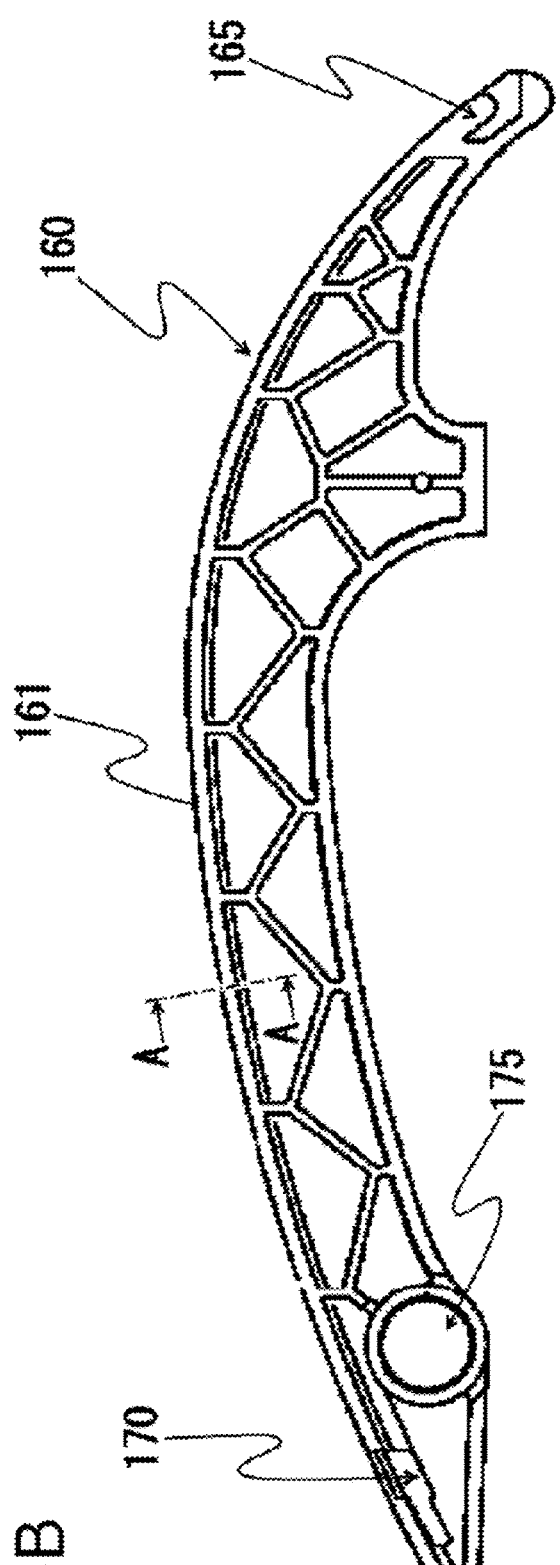
FIG. 4B is a side view illustrating the structure of the base member in the chain guide shown in FIG. 1.

The base member 160 includes, as shown in FIG. 4*h* and FIG. 4B, a shoe support surface 161 that is curved along the longitudinal guiding direction and supports the backside 113 of the guide shoe 110, the base groove 162 formed in the shoe support surface 161 for the shoe rib 130 of the guide shoe 110 to engage with such as to be slidable in the longitudinal guiding direction, a fixed-side engaged part 165 mated with the fixed hook 121 of the guide shoe 110 to form the fixed engaging part 120, and a movable-side engaged part 170 mated with the movable hook 126 of the guide shoe 110 to form the movable engaging part 125. Reference numeral 175 denotes a mounting part for a bolt or the like protruding from an engine block to pass through.

The base groove 162 preferably has a C-chamfered cross section so that there are no corners at the open edges.

Figure 5A:
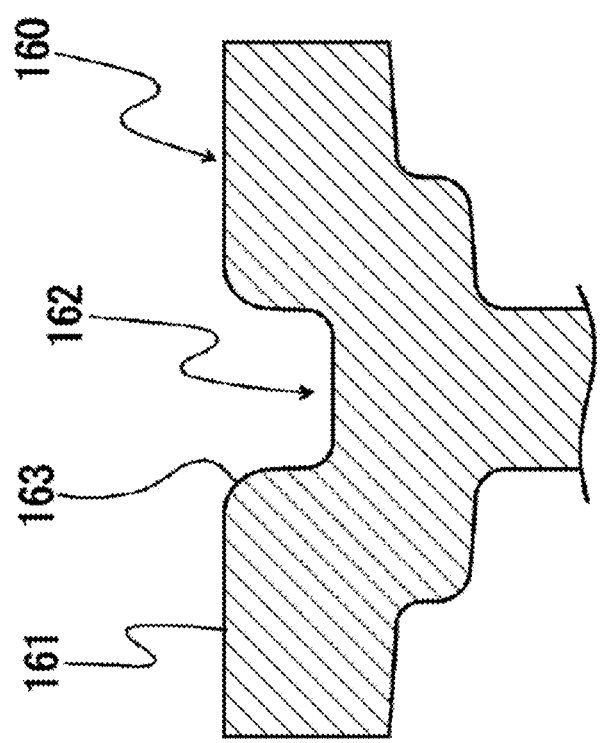
FIG. 5A is a cross-sectional view of an A-A section of FIG. 4B.

The base groove 162 of the base member 160 according to this embodiment has an R-chamfered cross-sectional shape at the open edge 163, for example, as shown in FIG. 5A. The R-chamfered cross-sectional shape in such a configuration should preferably have a radius of curvature of 1 mm or more, for example.

Figure 6A:
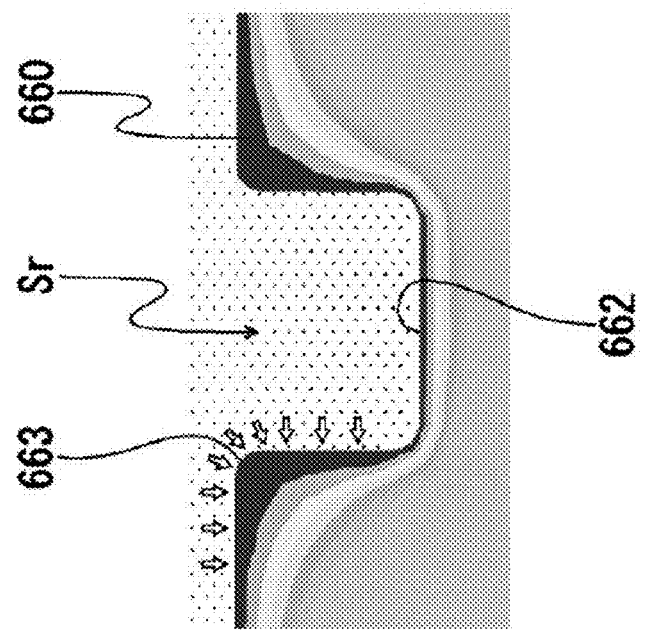
FIG. 6A is a conceptual schematic diagram illustrating how heat is conducted to the base member during molding of the guide shoe (second molding step) when the base groove has corners at open edges.

When a base groove 662 is configured to have corners at open edges 663 as shown in FIG. 6A, the heat during the molding of the secondary material that is to become the guide shoe (reference symbol Sr representing the guide shoe forming material) tends to concentrate at the open edges 663 of the base groove 662, and this high temperature can easily lead to welding of the guide shoe and the base member 660. In FIG. 6A, the solid black area represents the high-temperature region. The same applies to FIG. 6B and FIG. 6C.

Figure 6B:
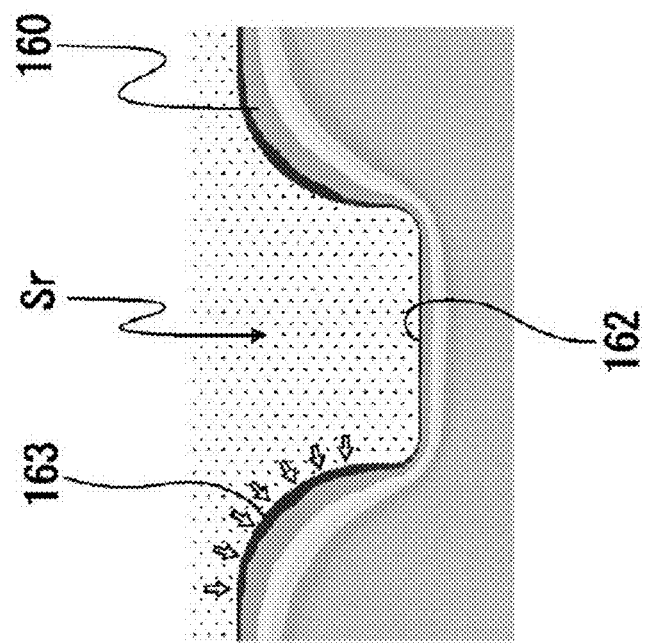
FIG. 6B is a conceptual schematic diagram illustrating how heat is conducted to the base member during molding of the guide shoe (second molding step) when the open edges of the base groove are R-chamfered.

The R-chamfered cross-sectional shape at the open edge 163 of the base groove 162 with a predetermined radius of curvature can dissipate the heat during the molding of the secondary material that is to become the guide shoe 110 as shown in FIG. 6B so that the heat during the molding of the guide shoe 110 is prevented from concentrating at the open edge 163 of the base groove 162 of the base member 160 that is the primary material.

Figure 5B:
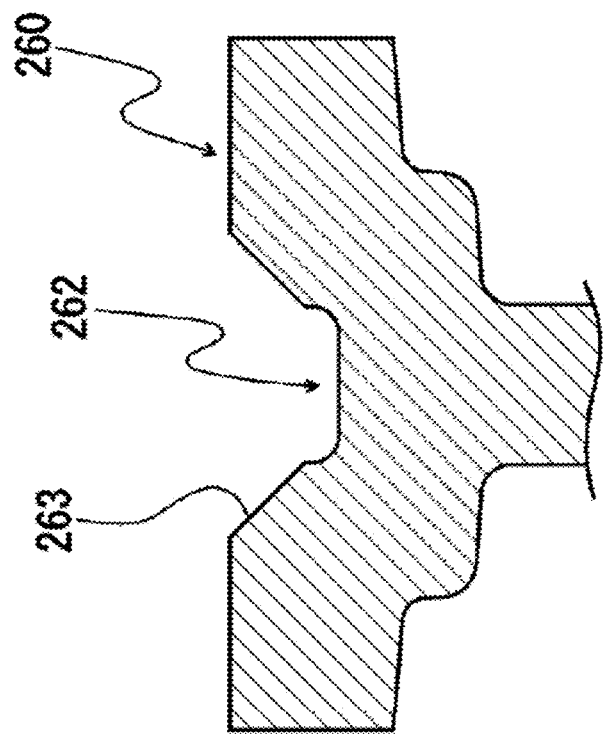
FIG. 5B is a cross-sectional view of the same portion as FIG. 5A illustrating the structure of the base member in the chain guide according to another embodiment of the present invention.
Figure 6C:
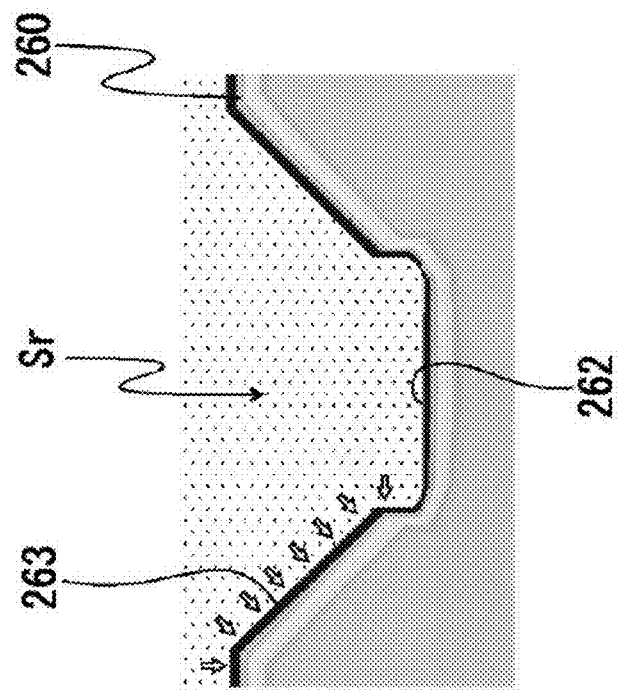
FIG. 6C is a conceptual schematic diagram illustrating how heat is conducted to the base member during molding of the guide shoe (second molding step) when the open edges of the base groove are C-chamfered.

As shown in FIG. 5B, the open edge 263 of the base groove 262 may have a C-chamfered cross-sectional shape. The same effects as described above can be achieved with the base member 260 of such a configuration. Namely, the chamfered cross-sectional shape at the open edge 263 of the base groove 262 can dissipate the heat during the molding of the secondary material that is to become the guide shoe 110 as shown in FIG. 6C so that the heat during the molding of the guide shoe 110 is prevented from concentrating at the open edge 263 of the base groove 262 of the base member 260 that is the primary material.

Figure 7:
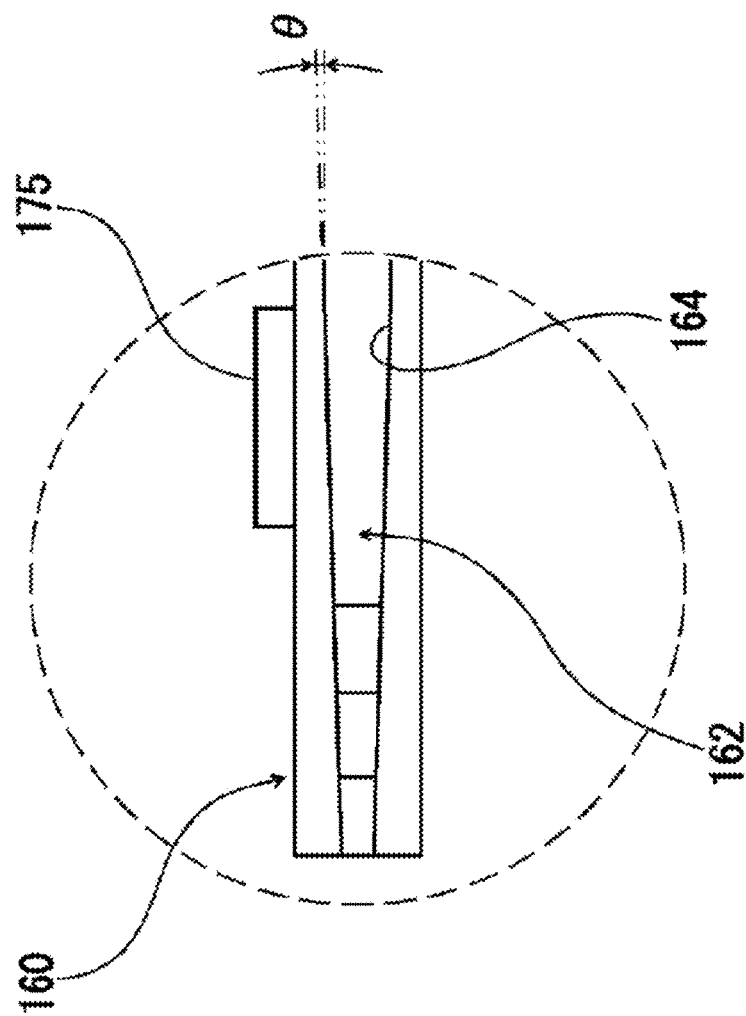
FIG. 7 is an enlarged view illustrating the region encircled by a broken line in FIG. 4A.

Preferably, the base groove 162 is increased in width gradually from the open end at the movable engaging part 125 toward the fixed engaging part 120 along the longitudinal guiding direction, as shown in FIG. 7.

The base groove 162 need not necessarily be increased in width over the entire length in the longitudinal guiding direction, and may be increased in width at least in a region in the longitudinal guiding direction where the cross section changes largely, such as the region where the movable-side engaged part 170 is formed, or the region where the mounting part 175 is provided. If this is the case, other parts of the base groove 162 are formed to have a uniform width (straight) along the longitudinal guiding direction.

The angle θ of the widening part 164 of the base groove 162 should preferably be 0.2° or more, for example, and more preferably from 0.2° to 1.0°. This configuration of the base groove 162 being opened up as a whole reliably prevents any performance degradation of the guide shoe 110 resulting from deformation during molding. On the other hand, too large a spread angle θ increases the size of the shoe rib 130 in the width direction of the guide, which may possibly lead to poorer precision of the sliding surface 112 caused by sink marks.

The guide shoe forming material and the base member forming material are selected from non-welding materials so that the guide shoe 110 and the base member 160 will not be welded together (i.e., bonded so that they cannot move relative to each other) under the temperature condition during the two-material molding.

For the guide shoe forming material, a resin having excellent wear resistance and self-lubricating properties, such as non-fiber-reinforced polyamide resin may be used.

For the base member forming material, a resin having a higher strength than the guide shoe forming material and excellent wear resistance, such as a fiber-reinforced resin, for example a reinforced polyamide resin containing glass fiber, may be used.

The guide shoe forming material and the base member forming material have different thermal expansion coefficients and heat shrinkage rates during molding, the thermal expansion coefficient and the heat shrinkage rate of the guide shoe forming material being higher than the thermal expansion coefficient and the heat shrinkage rate of the base member forming material, respectively. The base member forming material has a higher thermal conductivity than the guide shoe forming material.

Therefore, the guide shoe 110 and the base member 160 do not bond to each ether on the backside 113 and the shoe support surface 161 and are in contact with each other such as to be movable relative to each other. When the guide shoe 110 and the base member 160 undergo expansion and contraction resulting from a difference in an amount of thermal deformation caused by a thermal factor such as a thermal expansion coefficient (e.g., amount of thermal expansion and contraction resulting from a thermal expansion coefficient) in accordance with the temperature of the environment in which the chain guide 100 is used (in this embodiment, the atmospheric temperature of the engine when it is running and when it is stopped), the guide shoe 110 and the base member 160 move relative to each other, in particular more in the longitudinal guiding direction than in the width and height directions of the guide.

The thermal factor mentioned above includes thermal expansion coefficient and crystallization of a crystalline mold material that both depend on the ambient temperature, as well as thermal shrinkage rate during the molding.

Figure 8:
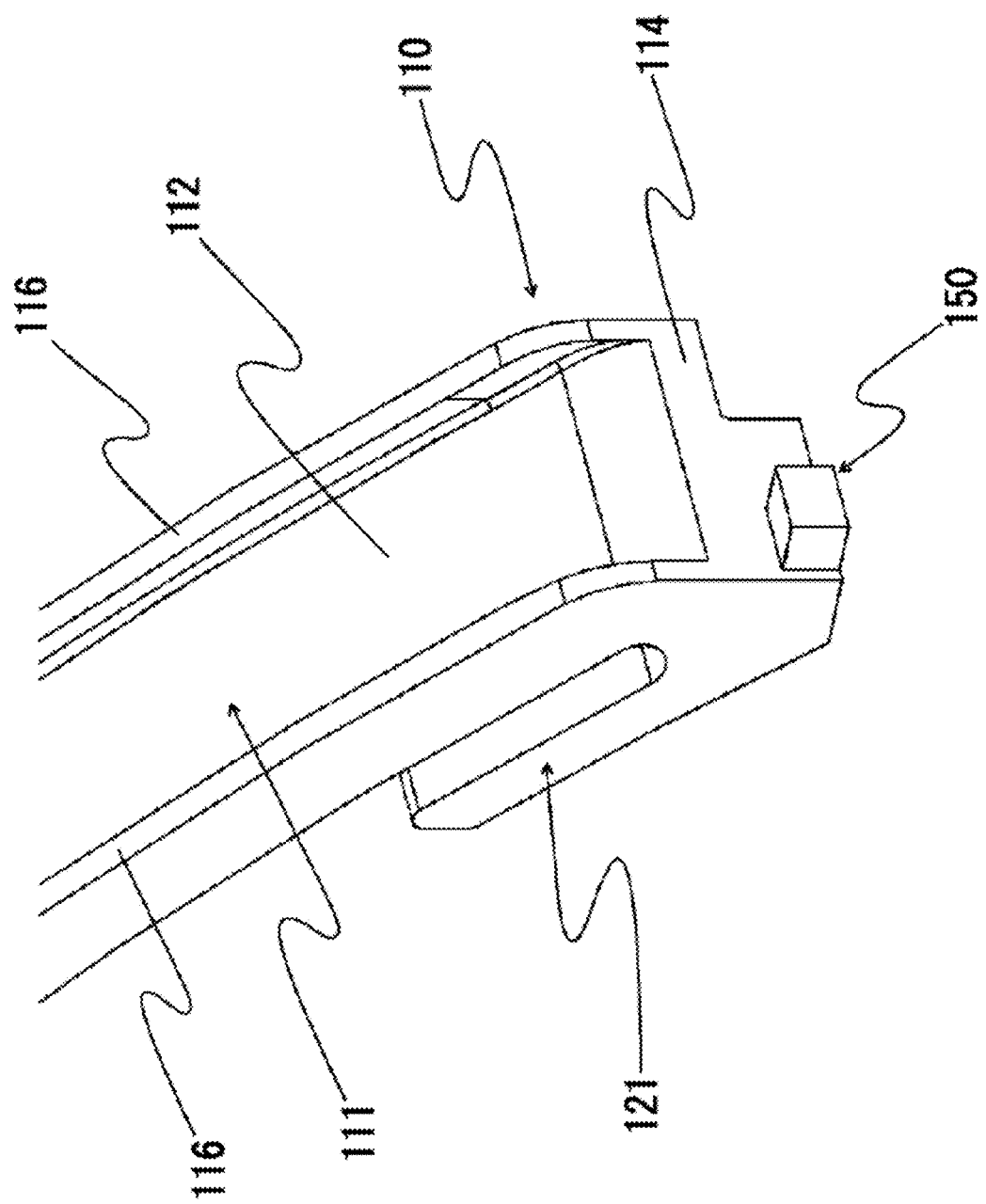
FIG. 8 is an enlarged perspective view of one end of the fixed engaging part side in the longitudinal guiding direction of the guide shoe of the chain guide shown in FIG. 1.

The chain guide 100 according to this embodiment is configured to have the guide shoe 110 and the base member 160 integrally formed and united by two-material molding, and includes a molding gate mark 150 that is square columnar for example, as shown in FIG. 8, on or near the fixed engaging part 120, more specifically on an end face of the fixed hook 121 in one end face 114 at one end of the fixed engaging part 120 side in the longitudinal guiding direction of the guide shoe 110.

For this chain guide 100, first, a base member forming material is injected into the mold from the gate at one end of the fixed engaging part 120 side in the longitudinal guiding direction in a first molding step by injection molding, to form the base member 160. This is followed by a second molding step by injection molding wherein a guide shoe forming material is injected into the same mold from the gate to form the guide shoe 110. The guide shoe 110 is thus integrated to the base member 160. Alternatively, the guide shoe 110 may be formed in the first molding step and the base member 160 may be made in the second molding step. In this case, the resultant chain guide will have the molding gate mark at one end of the fixed engaging part 120 side in the longitudinal guiding direction of the base member 160.

This configuration, i.e., the gate for the injection molding (opening for injecting molding material) being provided at one end of the fixed engaging part 120 side in the longitudinal guiding direction, basically allows the guide shoe forming material and the base member forming material to be injected into the mold uniformly and makes welding at the other end where there is the movable engaging part 125 less likely to happen. Therefore, possible restriction of movement of the guide shoe 110 along the longitudinal guiding direction can be avoided, and the intended performance of the guide shoe 110 can be ensured. This reliably prevents possible breakage of the guide shoe 110 due to the thermal stress resulting from a difference in thermal expansion and contraction between the guide shoe 110 and the base member 160 under varying temperatures in the environment of use, so that the durability can be improved. This is particularly advantageous when the chain guide has an overall length of more than 300 mm, for example, and is used in harsh environments where temperature changes are large.

While one embodiment of the present invention has been described above in detail, the present invention is not limited to this embodiment and may be carried out with various design changes without departing from the scope of the present invention set forth in the claims.

For example, for the chain guide according to this embodiment, as long as the resultant product has the molding gate mark at or near the fixed engaging part 120, the gate mark may be located anywhere (any type of molding gate may be used), there may be any number of gate marks, and the gate mark may come in various sizes, shapes, and designs, and there are no restriction.

Figure 9A:
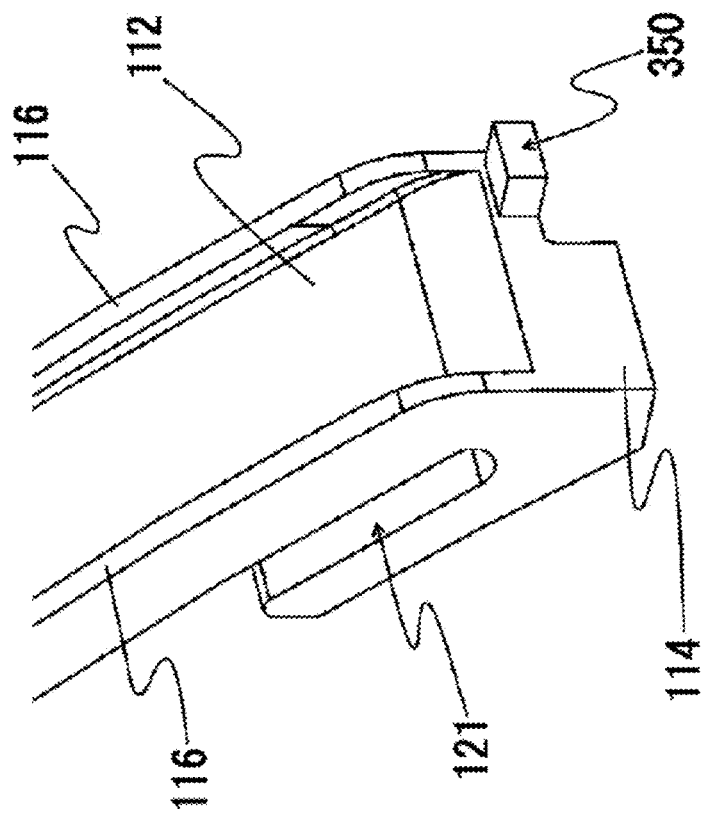
FIG. 9A is an enlarged perspective view of one end of the fixed engaging part side in the longitudinal guiding direction of the guide shoe, in another configuration example, of the chain guide according to the present invention.
Figure 9B:
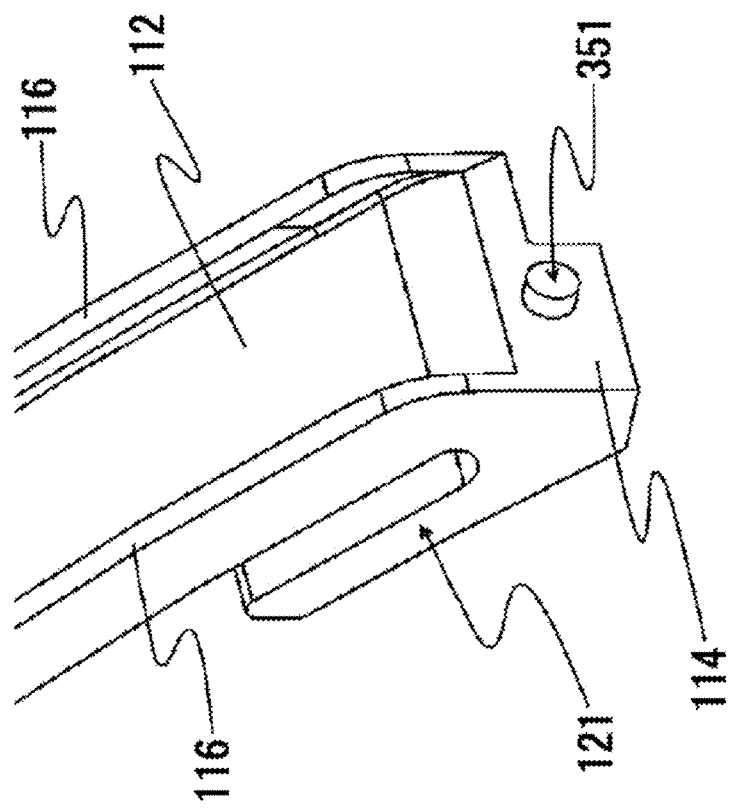
FIG. 9B is an enlarged perspective view of one end of the fixed engaging part side in the longitudinal guiding direction of the guide shoe, in yet another configuration example, of the chain guide according to the present invention.

Specifically, for example, the guide shoe having the gate mark on one end face of the fixed engaging part at one end in the longitudinal guiding direction may include a design wherein, as shown in FIG. 9A, the gate mark 350 is located on an end face of the sliding surface forming part, or a design wherein, as shown in FIG. 9B, the gate mark 351 is located in a central part in the width direction of the guide. The gate mark 351 may be cylindrical columnar as shown in FIG. 9B.

Figure 10A:
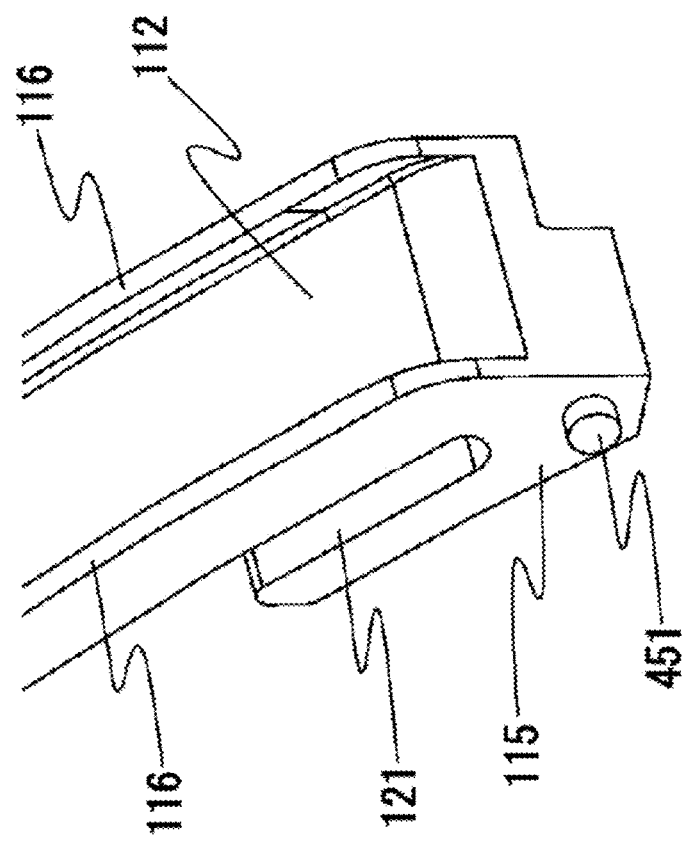
FIG. 10A is an enlarged perspective view of one end of the fixed engaging part side in the longitudinal guiding direction of the guide shoe, in a further configuration example, of the chain guide according to the present invention.
Figure 10C:
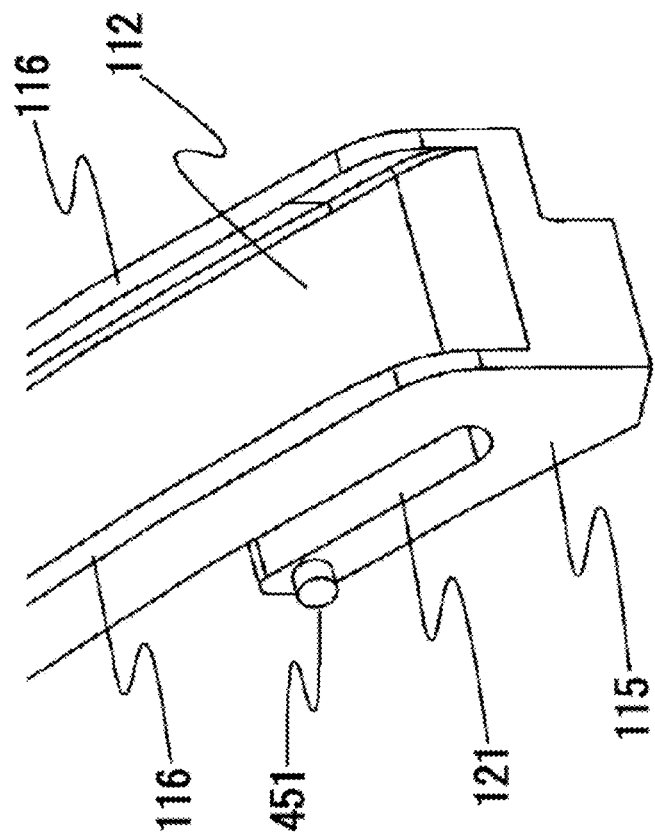
FIG. 10C is an enlarged perspective view of one end of the fixed engaging part side in the longitudinal guiding direction of the guide shoe, in yet another configuration example, of the chain guide according to the present invention.
Figure 11A:
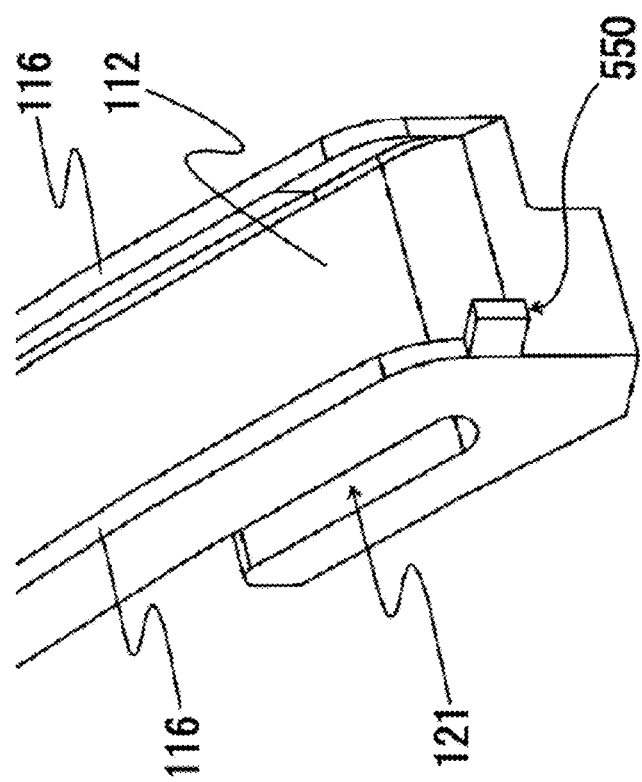
FIG. 11A is an enlarged perspective view of one end of the fixed engaging part side in the longitudinal guiding direction of the guide shoe, in further another configuration example, of the chain guide according to the present invention.
Figure 11B:
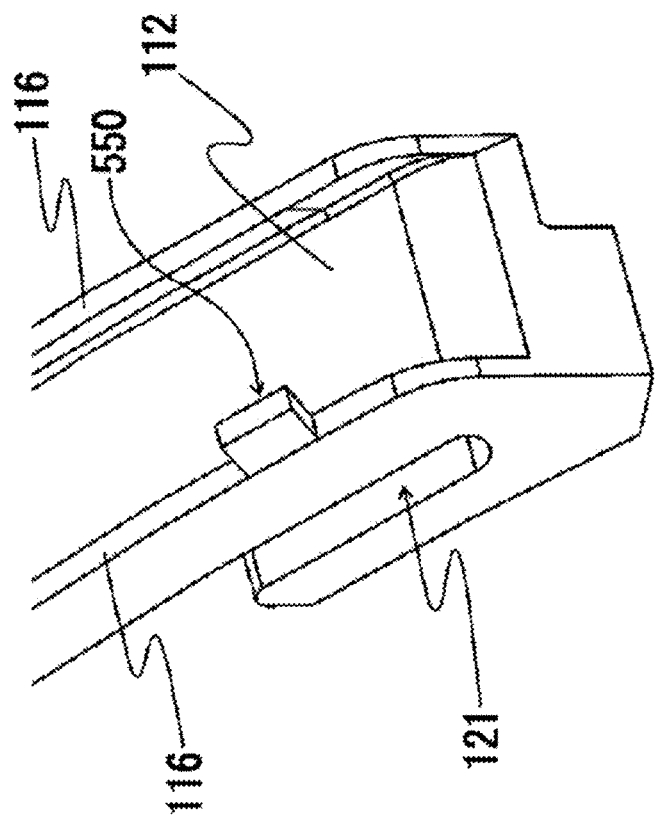
FIG. 11B is an enlarged perspective view of one end of the fixed engaging part side in the longitudinal guiding direction of the guide shoe, in another configuration example, of the chain guide according to the present invention.

Other possible designs include the guide shoe 110 having a gate mark 451 on one side face 115 as shown in FIG. 10A to FIG. 10C, or the guide shoe 110 having a gate mark 550 on an upper face or on one end face at one end in the longitudinal guiding direction of the lip 116, as shown in FIG. 11A and FIG. 11B.

When the gate mark 451 is formed on the side face of the guide shoe 110, the gate mark 451 may be on either one of the side faces, or on both side faces. The same applies to when the gate mark 550 is formed on the lip 116.

The same effects as the chain guide 100 according to the embodiment described above can be achieved with a chain guide with a guide shoe having any of the configurations shown in FIG. 9A, FIG. 9B, FIG. 10A to FIG. 10C, FIG. 11A, and FIG. 11B.

What is claimed is:

1. A chain guide comprising: a guide shoe having a slidingly-contacting surface on a front side for a running chain to be in sliding contact thereon; and a base member having a shoe support surface for supporting a backside of the guide shoe along a longitudinal guiding direction, the guide shoe and the base member being united by being integrally formed, the guide shoe having a shoe rib formed on the backside to extend in the longitudinal guiding direction, the base member having a base groove formed in the shoe support surface to extend in the longitudinal guiding direction, the base groove being configured to engage with the shoe rib such that the shoe rib is movable relative to the base member in the longitudinal guiding direction and restricted from moving in a width direction, wherein the chain guide includes a fixed engaging part where the guide shoe engages with the base member such that the guide shoe is restricted from moving in the longitudinal guiding direction relative to the base member, and a movable engaging part where the guide shoe engages with the base member such that the guide shoe is movable in the longitudinal guiding direction relative to the base member, and the chain guide includes a molding gate mark positioned at or near the fixed engaging part.

2. The chain guide according to claim 1, wherein the fixed engaging part is provided at one end in the longitudinal guiding direction, and the gate mark is formed on an end face of the guide shoe at the one end of the fixed engaging part side in the longitudinal guiding direction.

3. The chain guide according to claim 1, wherein the base groove has a R-chamfered cross-sectional shape at an open edge, with a radius of curvature of the R-chamfered cross-sectional shape being 1 mm or more.

4. The chain guide according to claim 1, wherein the base groove has a C-chamfered cross-sectional shape at an open edge.

5. The chain guide according to claim 1, wherein the base groove increases in width gradually toward the fixed engaging part along the longitudinal guiding direction in a region including a position where the movable engaging part is formed.

* * * * *